INVENTOR.
Serenus H. A. Young,
BY
ATTORNEYS.

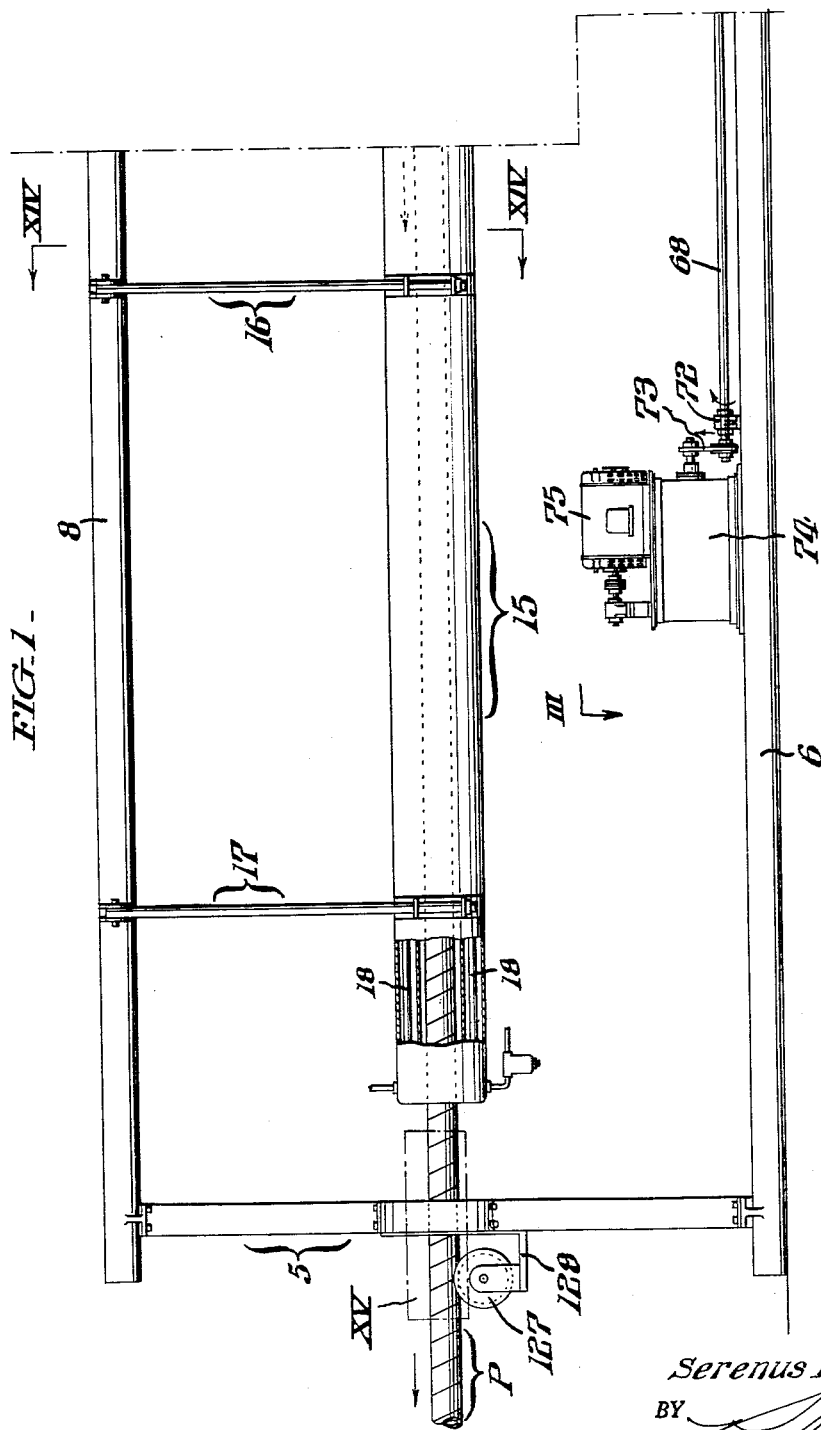

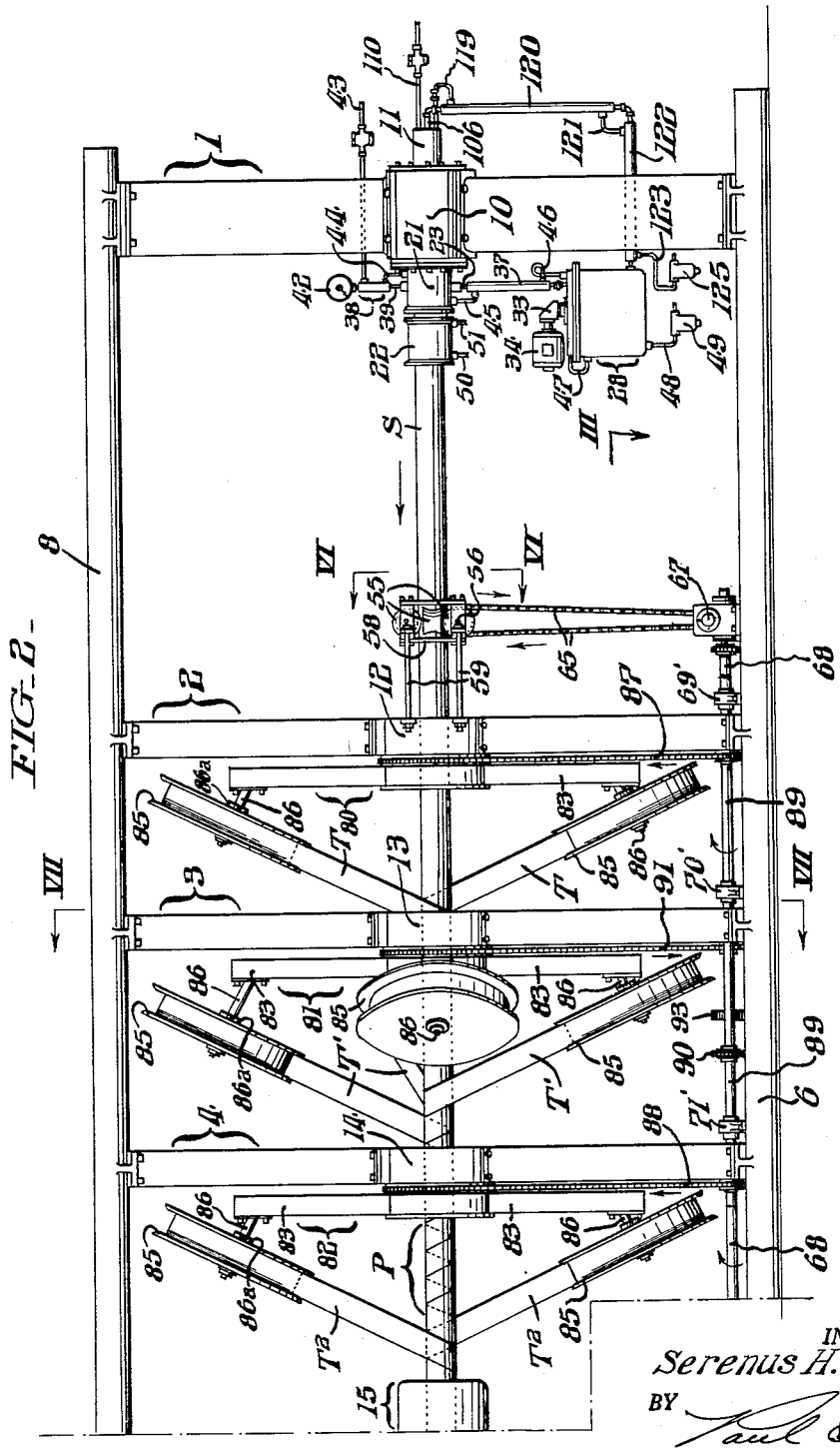

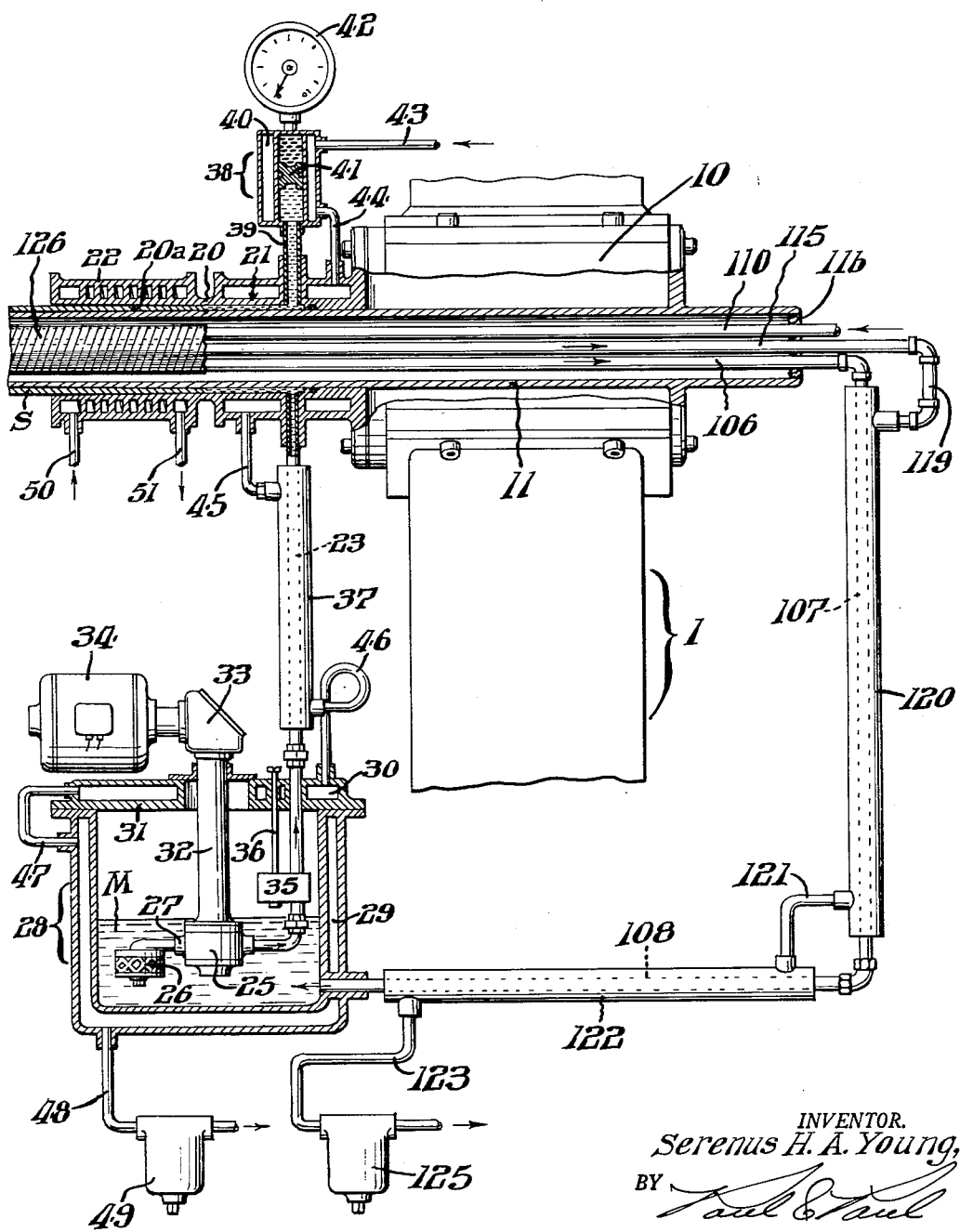

July 25, 1961 S. H. A. YOUNG 2,993,526
APPARATUS AND METHOD OF MAKING HOLLOW
ELONGATED PLASTIC PRODUCTS
Filed Jan. 31, 1958 13 Sheets-Sheet 5
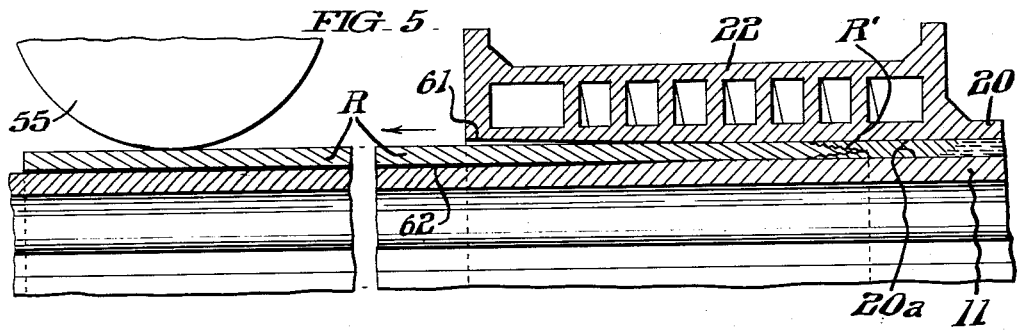
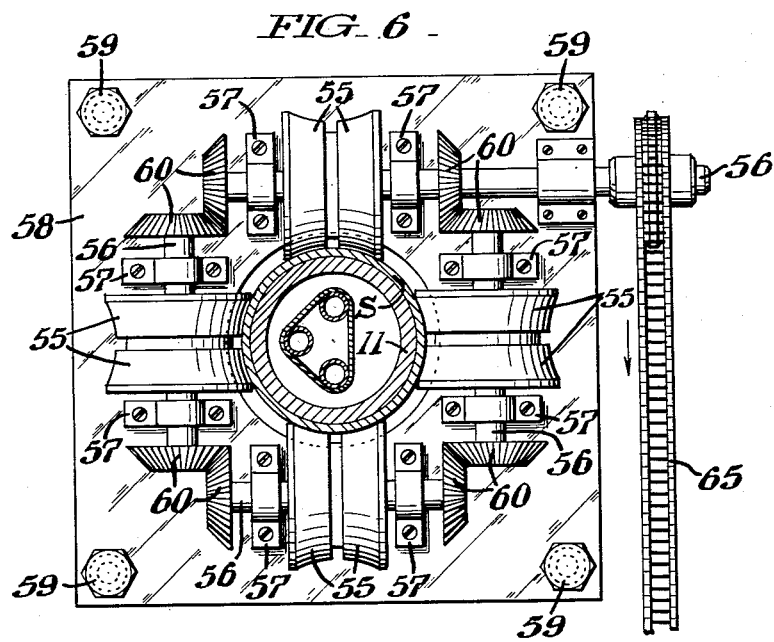
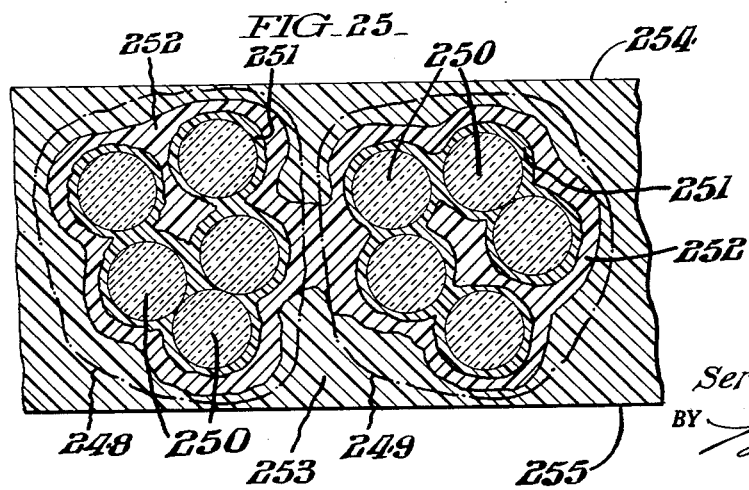
INVENTOR.
*Serenus H. A. Young,*
BY
ATTORNEYS.

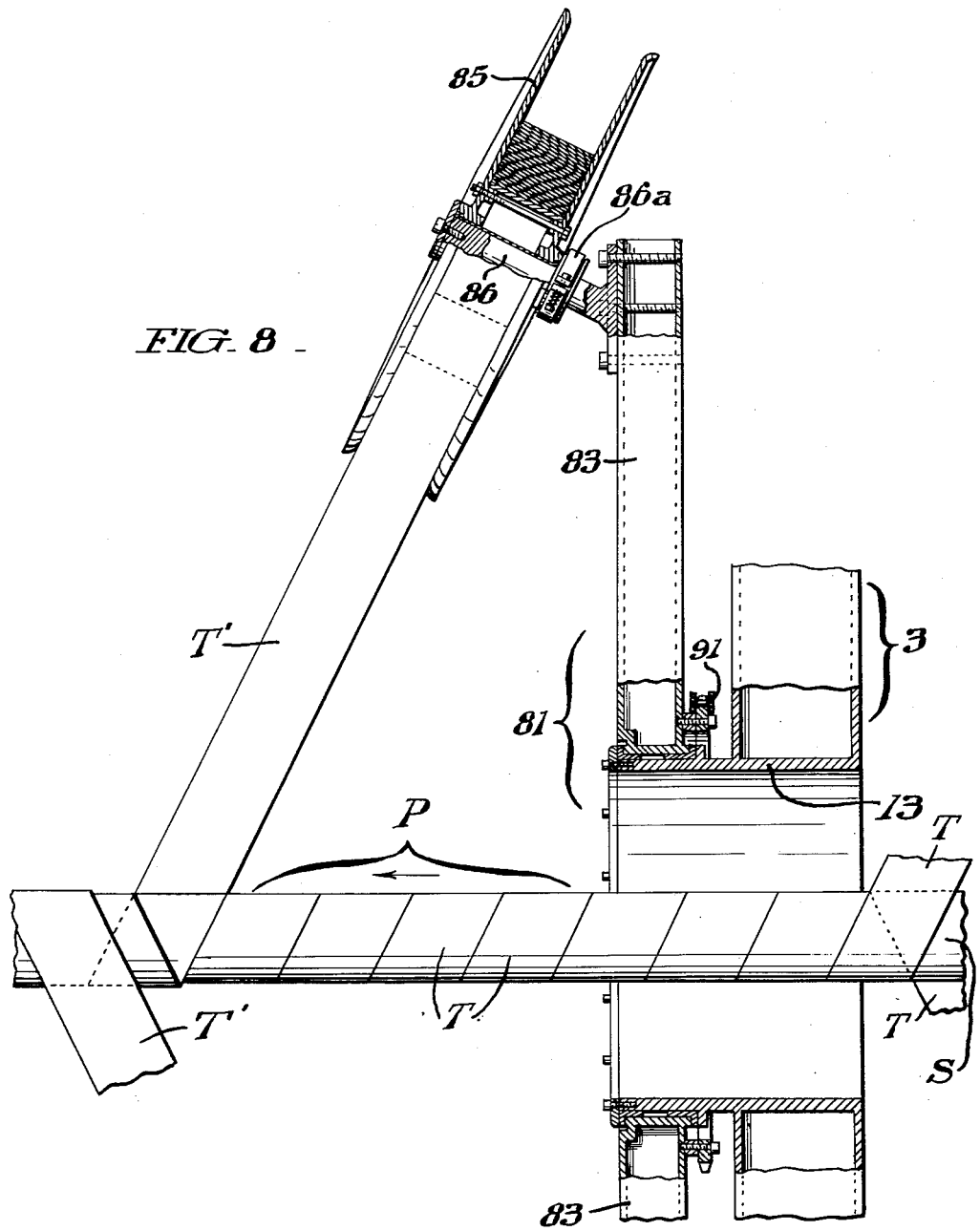

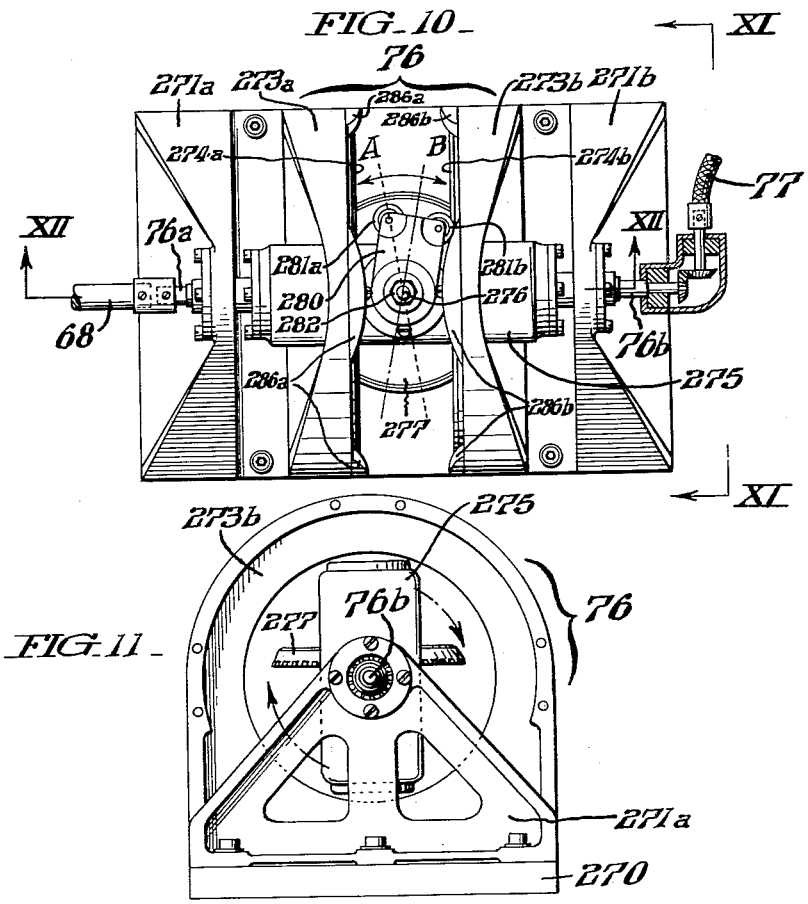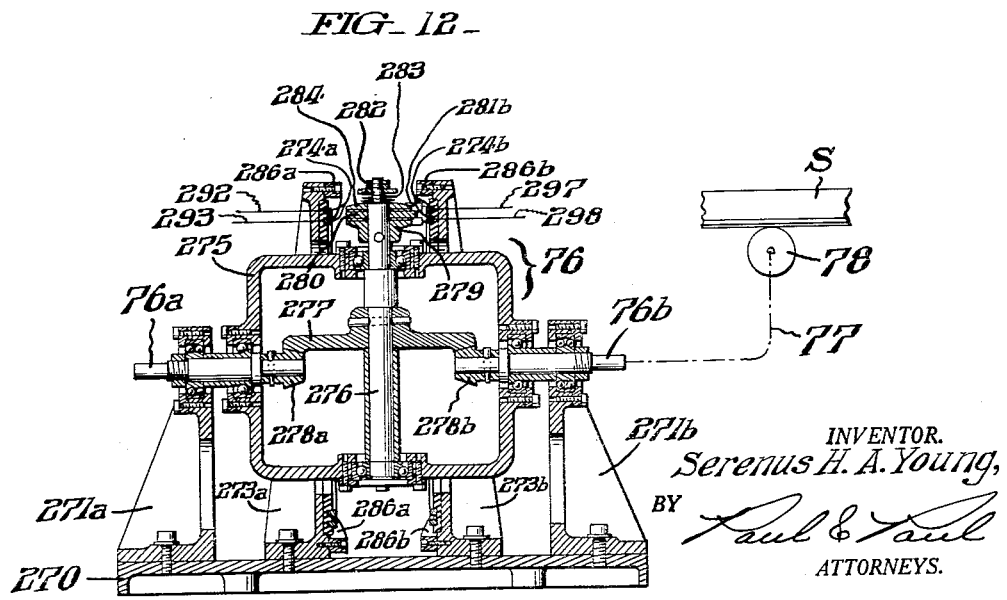

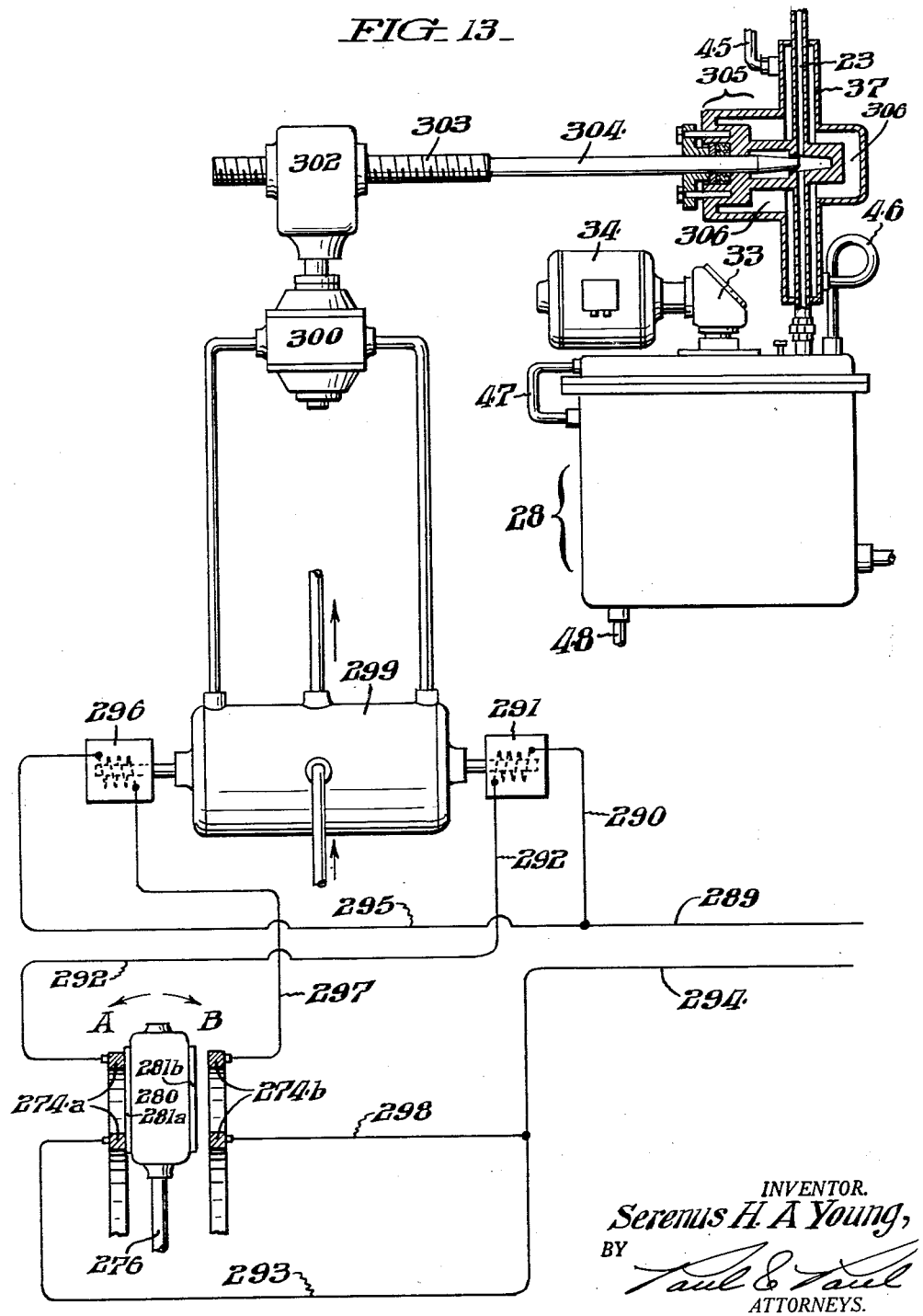

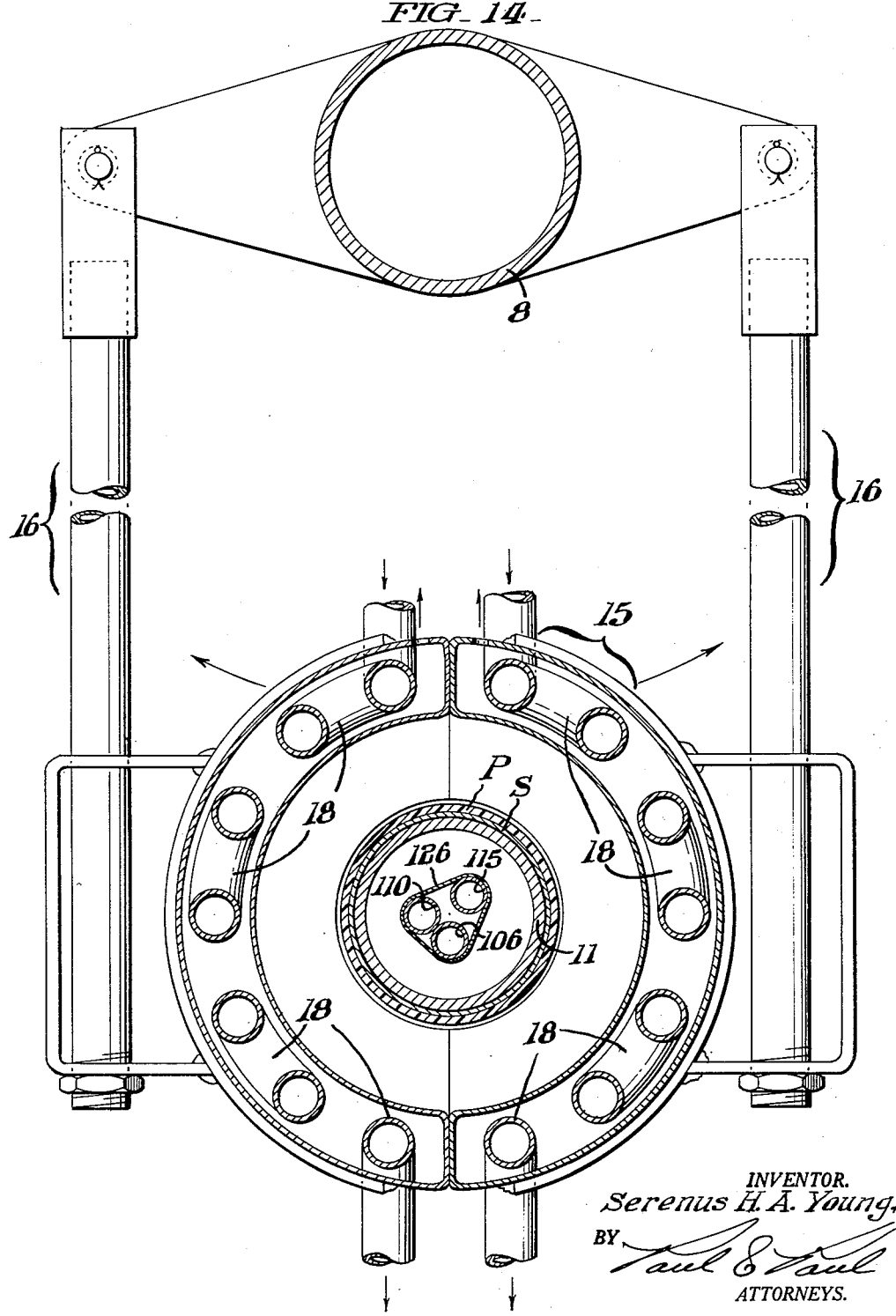

July 25, 1961
S. H. A. YOUNG
2,993,526
APPARATUS AND METHOD OF MAKING HOLLOW
ELONGATED PLASTIC PRODUCTS
Filed Jan. 31, 1958
13 Sheets-Sheet 11
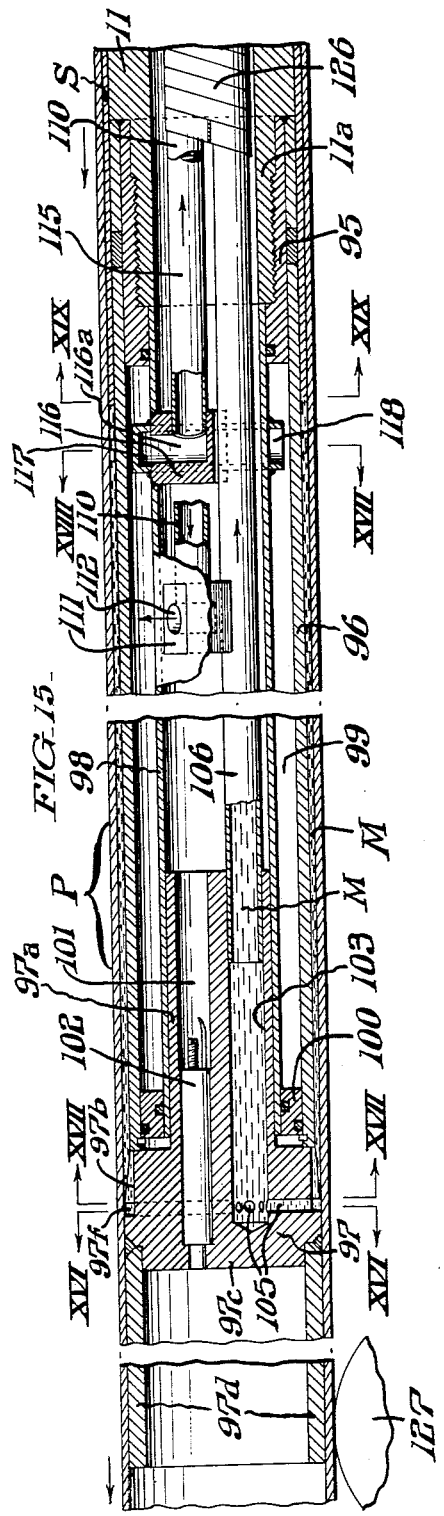
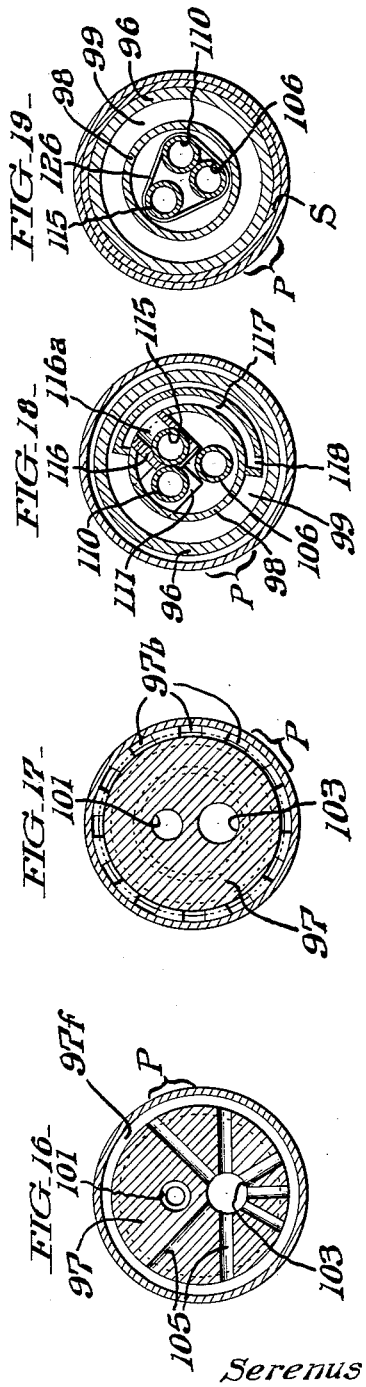
INVENTOR.
Serenus H. A. Young,
BY
ATTORNEYS.

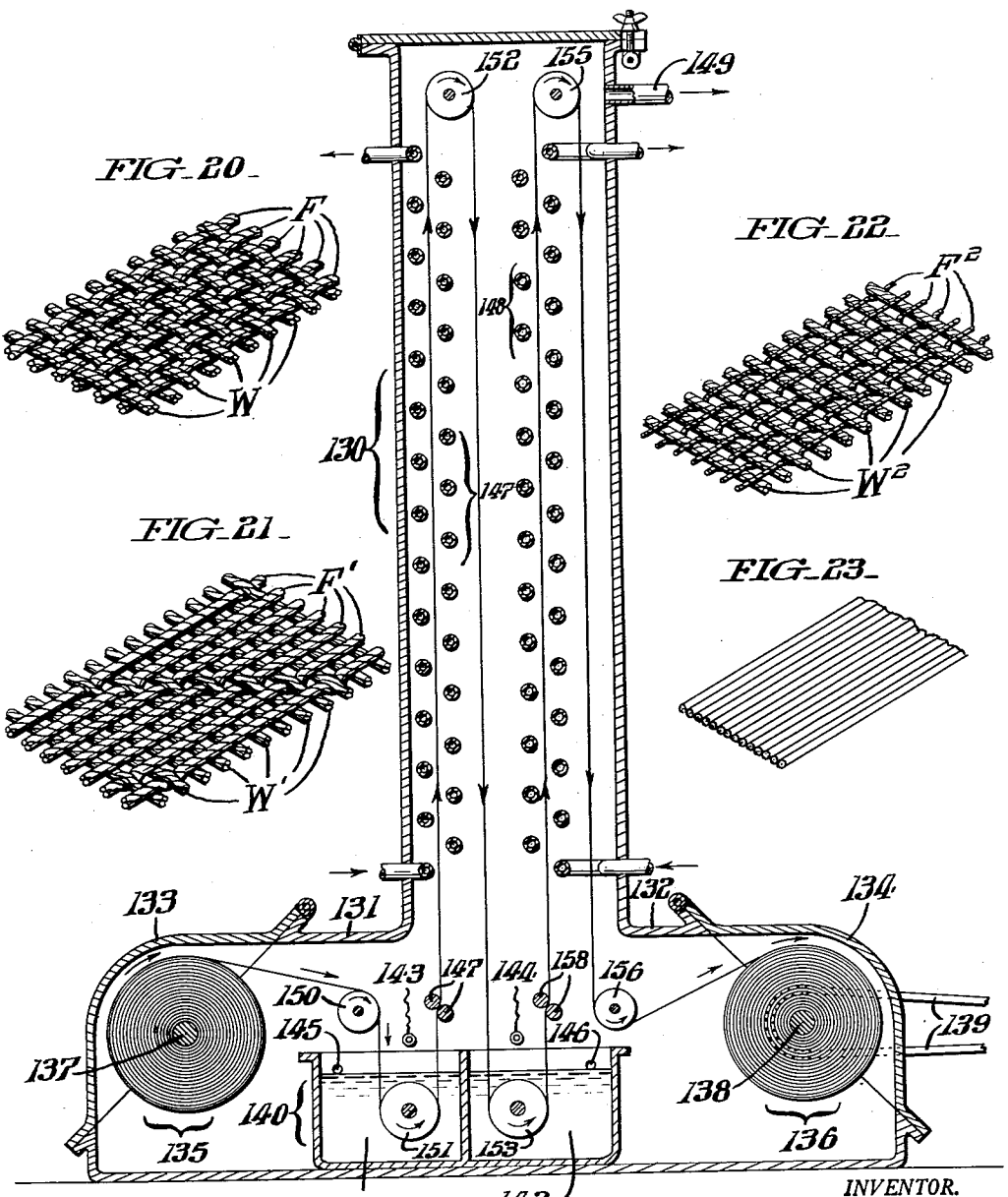

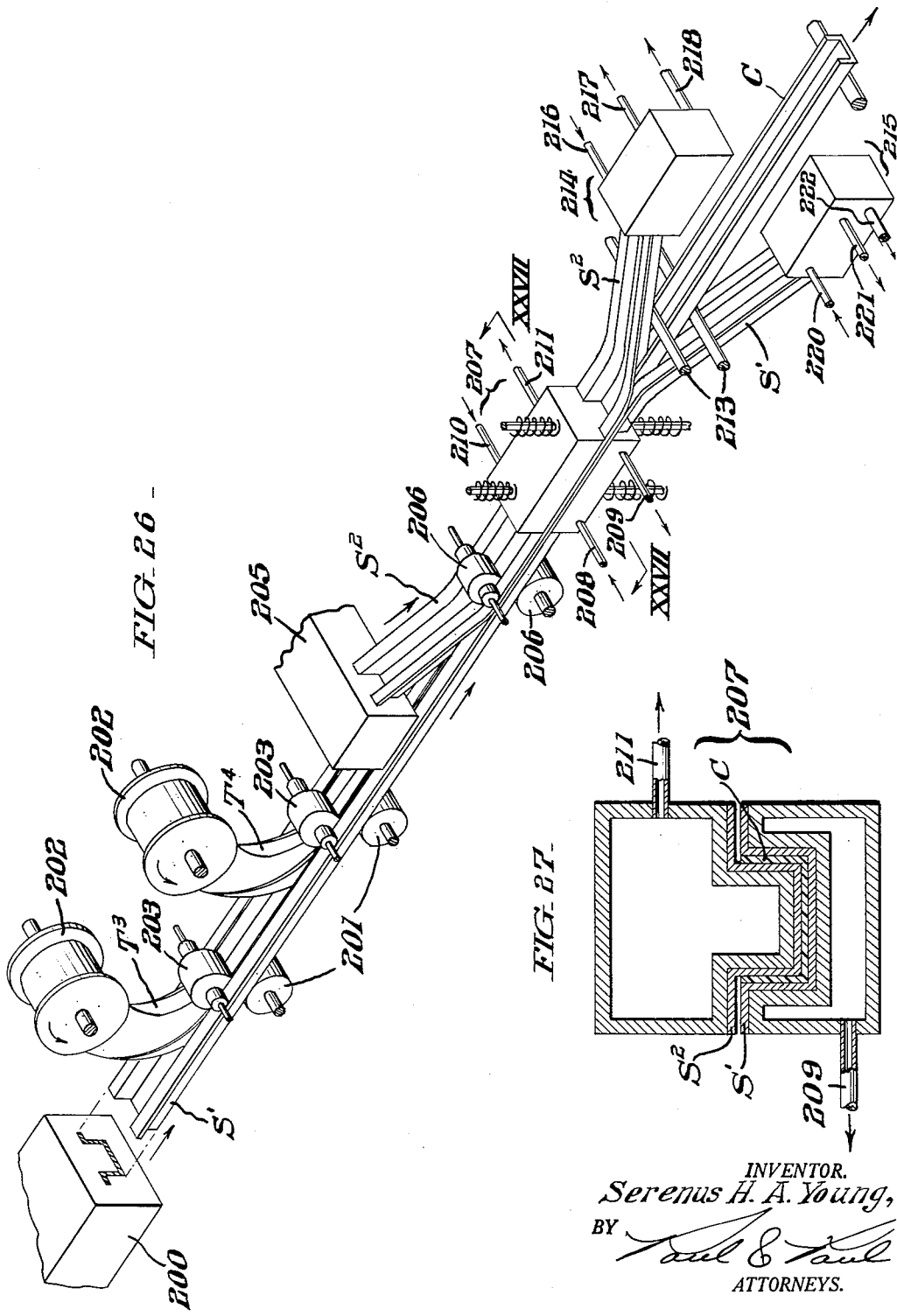

United States Patent Office 2,993,526
Patented July 25, 1961

---

2,993,526
APPARATUS AND METHOD OF MAKING HOLLOW ELONGATED PLASTIC PRODUCTS
Serenus H. A. Young, 1309 Dermond Road, Drexel Hill, Pa., assignor of small interest to various assignees
Filed Jan. 31, 1958, Ser. No. 712,425
18 Claims. (Cl. 154—1.8)

This invention relates to improvements in the fabrication of elongated plastic articles, such as piping, channels, angles, I-beams and the like, and more particularly relates to novel apparatus and processes for fabricating such articles.

Heretofore, hollow, elongated plastic products, such as piping, generally have been made by hand methods by wrapping the reinforcing fibers around a steel mandrel, impregnating the fibers with a resin, curing the impregnated resin and then removing the mandrel to complete the article. Another method which often has been used is to substitute a spirally wound paper tube for the steel mandrel and, after curing the pipe, the entire assembly is immersed in water to soften the paper tube and dissolve its laminating adhesive, thereby facilitating its removal from the interior of the plastic pipe. The necessity for hand labor and the extensive amount of time consumed in the use of these methods have been significant factors in deterring the adoption of plastic pipe in industry, notwithstanding that such piping has proven to have numerous advantages over steel piping for many purposes.

The chief aim of this invention is to provide novel method and apparatus whereby shaped elongated plastic articles, such as piping, channels, angles, I-beams and the like, can be continuously and automatically produced in quantity while effecting substantial economic savings from the standpoint of materials and labor costs.

A further object of this invention is to provide novel method and apparatus whereby shaped elongated plastic articles can be produced continuously and automatically in quantity in the field where such articles are to be placed in use.

A further object of this invention is to provide a method of fabricating shaped elongated plastic articles comprising the steps of continuously forming a rigid temporary shaping support, such as a mandrel or mold, from metal having a relatively low melting point; continuously advancing the support in an axial direction; applying on the advancing support resin bearing tape to form the article; curing the resin while the article is on the advancing support; and melting the temporary shaping support and removing the molten metal from the article.

A still further object of this invention is to provide apparatus for fabricating shaped elongated plastic articles comprising means for continuously forming a rigid temporary shaping support, such as a mandrel or mold, from metal having a relatively low melting point; means for continuously advancing the support in an axial direction; means for applying on the advancing support resin bearing tape to form the article; a resin curing chamber through which the article is passed while on the advancing support; and means for melting the temporary shaping support and removing the molten metal from the article.

Another object is to provide vacuum apparatus whereby the tapes utilized in the practice of this invention may be continuously impregnated with resin without incidental formation of air inclusions or voids therein which would weaken the resulting plastic structure.

Other objects and attendant advantages will appear from the following detailed description of the attached drawings, wherein:

FIGS. 1 and 2, taken together, show in side elevation preferred apparatus embodying this invention for the continuous fabrication of plastic tubing or piping.

FIG. 4 is an enlarged, fragmentary, elevational view partly in section of the extrusion means for forming the temporary shaping support.

FIG. 5 is a fragmentary view in section drawn to a still larger scale showing in detail means for commencing the extrusion of the temporary shaping support.

FIG. 6 is a cross sectional view taken as indicated by the angled arrows VI—VI in FIG. 2 showing means provided for axially advancing the temporary shaping support.

FIG. 8 is an enlarged fragmentary view partially in section taken as indicated by the angled arrows VIII—VIII in FIG. 7.

FIG. 10 is an enlarged view looking as indicated by the angled arrows X—X in FIG. 9 showing in top plan a differential speed control device for controlling the linear speed of the temporarly shaping support.

FIG. 11 is a view looking as indicated by the angled arrows XI—XI in FIG. 10.

FIG. 12 is a schematic view in section taken as indicated by the angled arrows XII—XII in FIG. 10.

FIG. 13 is a schematic view showing the operation of the electric circuits of the differential speed control device of FIGS. 9–12.

FIG. 14 is an enlarged cross sectional view taken as indicated by the angled arrows XIV—XIV in FIG. 1.

FIG. 15 is an enlarged fragmentary, detailed view in longitudinal section of the remelting head of the apparatus, the same being disposed within the confines of the broken line rectangle XV in FIG. 1.

FIGS. 16, 17, 18 and 19 are cross sectional views taken, respectively, as indicated by the angled arrows XVI—XVI, XVII—XVII, XVIII—XVIII, and XIX—XIX in FIG. 15.

FIGS 20, 21, 22 and 23 are fragmentary perspective views showing different types of tapes which may be used in this invention.

FIG. 24 is a view in longitudinal section of a preferred apparatus for impregnating the tapes with resin.

FIG. 25 is a fragmentary, schematic view in cross section of a tape after treatment in the apparatus of FIG. 24.

FIG. 26 is a schematic view in perspective showing how plastic channel section strips may be continuously produced in accordance with this invention; and FIG. 27 is an enlarged cross sectional view taken as indicated by the angled arrows XXVII—XXVII in FIG. 26.

Figure 7:
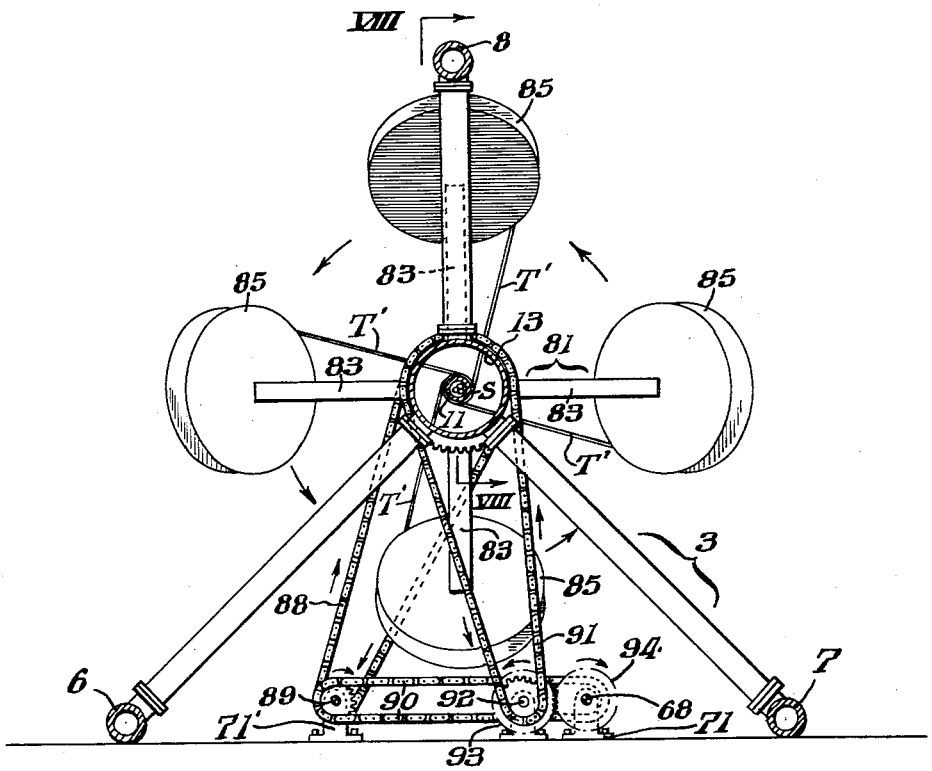
FIG. 7 is a cross sectional view taken as indicated by the angled arrows VII—VII in FIG. 2 showing the means by which tapes are wound about the advancing temporary shaping support to form a continuous tube or pipe.

In describing the preferred embodiments of this invention illustrated in the drawings, specific terminology will be resorted to for the sake of clarity. However, it is not my intention to be limited to the specific terms so selected, and it is to be understood that each specific term includes all technical equivalents which operate in a similar manner to accomplish a similar purpose.

Description of preferred apparatus

With reference first to FIGS. 1, 2 and 7 of the drawings, it will be seen that the frame of the preferred apparatus there exemplified includes a plurality of spiderlike transverse frame members 1, 2, 3, 4 and 5 arranged in suitably spaced relation. Each frame member comprises an upper vertical tubular arm and two lower divergent tubular arms, each of which is suitably joined to a centrally located juncture, such as the hollow sleeve 13 shown in FIG. 7. The lower arms of each frame are connected at their bottoms to tubular base longitudinals 6 and 7, and the upper arms thereof are connected at their tops to tubular overhead longitudinal 8.

Supported horizontally by a cylindrical head 10 at the juncture of the three arms of the frame 1 is a hollow tube 11, preferably of steel, which, see FIG. 4, is closed at its protruding right hand end by end wall 11b and which, as will be seen presently, is intended to serve as a fixed mandrel. As further shown, the fixed mandrel 11 extends leftward horizontally from the head 10 and through the hollow sleeves 12, 13 and 14 of frames 2, 3 and 4 and through a longitudinally split hollow curing chamber or oven 15, see FIG. 14, of which the component half sections are hung by pivoted suspensions 16 and 17 from the overhead longitudinal 8 in the interval between frames 4 and 5. Each component half section of the curing chamber 15 contains a coil 18 through which steam is circulated.

Mounted telescopically of mandrel 11 and affixed to the left hand end of head 10, as by bolts passing through its flange, see FIG. 4, is a sleeve 20 surrounded by a steam jacket 21 and a water jacket 22. Sleeve 20 is formed with a counterbore, somewhat larger in diameter than the outside diameter of mandrel 11, which extends inwardly from the distal end of sleeve 20 to a terminus slightly beyond the central transverse plane of the jacket 21. The uniform annular space 20a between mandrel 11 and the counterbore of sleeve 20, as presently explained, serves as an extrusion passage.

Connecting into the annular space 20a is a pipe 23 which leads from a rotary pump 25 having a filter 26 attached to its inlet 27. As shown, the pump 25 is disposed within a reservoir or tank 28 containing molten metal M having a relatively low melting point. The metal M preferably is a plastic range alloy, such as an antimony-bismuth or antimony-bismuth-lead alloy having a melting point of approximately 227° F. and a freezing point of approximately 205° F.

The metal M is maintained in a molten state in reservoir 28 by circulation of steam through the jacket 29 about the reservoir 28 and through the hollow 30 of the reservoir cover 31. En route from the reservoir 28 to the annular space 20a, the metal M is maintained in its molten state by circulation of steam through a jacket 37 surrounding the pipe 23 and through the jacket 21 surrounding the sleeve 20.

The housing of the pump 25 has an upwardly extending tubular arm 32 which emerges through the cover 31 of the reservoir 28. The shaft (not shown) of the pump 25 extends up through the arm 32, and is driven, through a speed reducer 33, by an electric motor 34 mounted on the reservoir 28. The flow of molten metal from the pump 25 is controllable by means of a relief valve 35 which is interposed in the pipe 23 within the reservoir 28, and which has a regulating stem 36 extending up through the tank cover 31 for accessibility. In order to eliminate the possibility of oxidation of the molten metal M, a neutral atmosphere, preferably of nitrogen, is maintained in reservoir 28.

A pressure gauge 42 is connected to the annular space 20a through a cylinder 38 and a pipe 39. Disposed within the cylinder 38 is a steel float 41 supported by molten metal from the annular space 20a. The pressure of the molten metal is transmitted through the float 41 and a medium of oil disposed above the float to the gauge 42. The metal within cylinder 38 is maintained in a molten state by circulation of steam through the jacket 40.

Steam at a temperature sufficient to maintain the metal in its molten condition enters the jacket 40 of the cylinder 38 through a pipe 43 and, after passing through the jacket 40, enters the jacket 21 of the sleeve 20 through a connecting pipe 44. The steam proceeds from jacket 21 by way of connecting pipe 45 to the jacket 37 surrounding the pipe 23, then through connecting pipe 46 to the hollow 30 of the reservoir cover 31, then through connecting pipe 47 to the jacket 29 of the reservoir 28 from whence it is carried off by means of pipe 48 in which a trap 49 is interposed.

A coolant, which may be water, is circulated through the jacket 22 of the sleeve 20, the water entering by way of pipe 50 and leaving by way of pipe 51. Jacket 22 is spiralized internally to cause swirling of the coolant several times about the sleeve 20 before discharge from the jacket.

With steam and water circulating through the apparatus, the pump 25 continuously pumps molten metal M from reservoir 28 through pipe 23 to the annular space 20a. Under the discharge pressure of the pump 25, the annular space 20a is filled with the metal M which is extruded therethrough in the form of a cylinder to the outside atmosphere. As the molten metal is extruded through the annular space 20a, it solidifies in the area adjacent the water jacket 22. The solidified metal M exits from sleeve 20 on mandrel 11 as a continuous temporary shaping support or mandrel S at a temperature on the order of 180° F.

The molten metal M preferably is extruded under a pressure of approximately 25 p.s.i. through the action of pump 25. This pressure is sufficient to maintain the molten metal in motion, but is not sufficient to impart linear movement to the entire elongated temporary mandrel S. The solidified mandrel S is advanced horizontally from the annular space 20a along the permanent mandrel 11 by a group of feed rolls 55 (see FIGS. 2, 5 and 6) of which the shafts 56 are rotatively supported in bearings 57 affixed to a plate 58 sustained by tie bolts 59 from the sleeve 12 of the frame 2. As shown in FIG. 6, the rolls 55 are rotated in unison as a consequence of the interconnection of their shafts 56 by miter gear couples 60. To facilitate linear movement of the mandrel S upon the mandrel 11 under the action of the rollers 55, the counterbore of the sleeve 20 is flared slightly at its distal end at 61 (see FIG. 5), while the permanent mandrel 11 is reduced slightly in diameter at 62 for the remainder of its length. While the solidified mandrel S is itself relatively rigid, it is supported for its entire length by the inner permanent mandrel 11.

Figure 3:
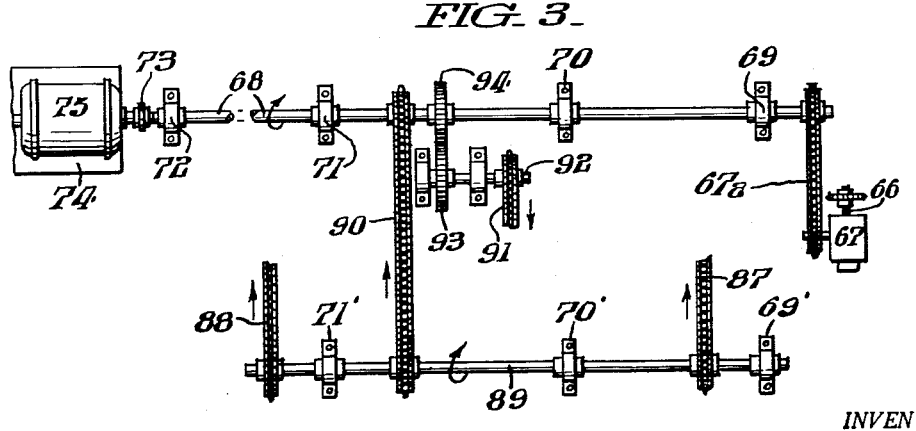
FIG. 3 is a reduced fragmentary view looking as indicated by the angled arrows III—III in FIGS. 1 and 2 showing the drive mechanism in top plan.
Figure 9:
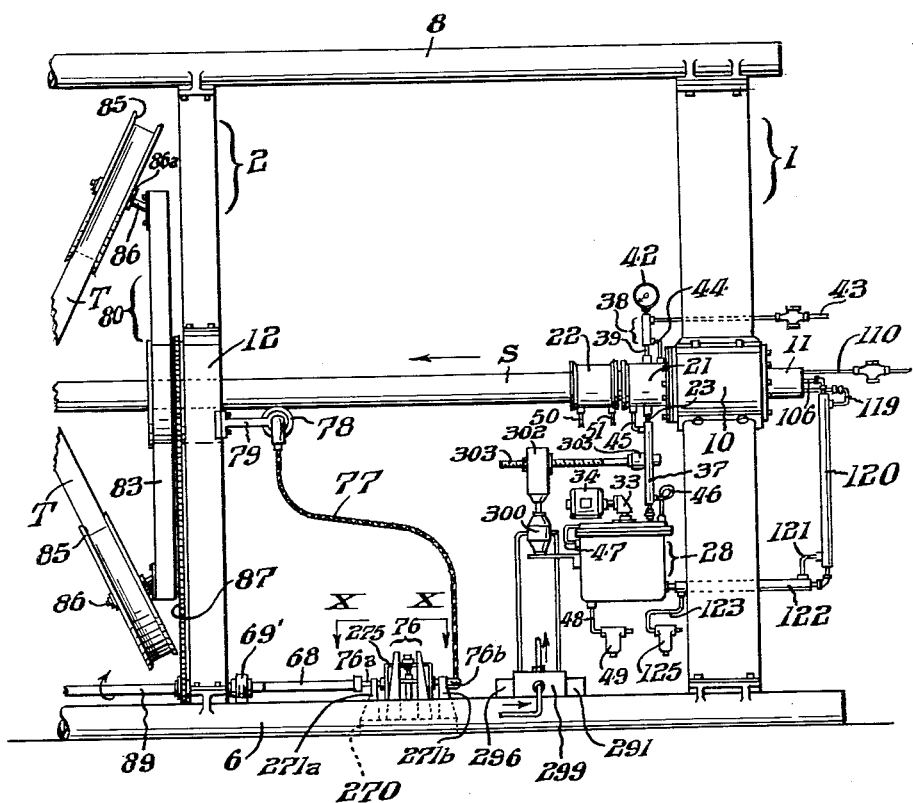
FIG. 9 is a fragmentary view in side elevation showing modified means for advancing the temporary shaping support in timed relation to the tape winding means.

Referring again to FIGS. 2 and 6, rotary motion is transmitted to one of the roll shafts 56 by a sprocket chain 65 from the output shaft 66 of a variable speed transmission 67 which, in turn, is driven by a sprocket chain 67a from a horizontal main shaft 68 (see FIG. 3) rotatively supported by spaced bearings 69, 70, 71 and 72 affixed to the floor. Shaft 68 is driven through a belt or chain 73 from the output shaft of a speed reducer 74 powered by an electric motor 75.

Upon starting the apparatus, before any portion of the mandrel S has been extruded, special means must be utilized to form the mandrel S and impart axial movement to it after it has solidified in the annular space 20a. As shown in FIG. 5, this means comprise a longitudinally split sleeve R having inside and outside diameters substantially equal to those of the temparary mandrel S so that the longitudinal sleeve sections may be inserted within the annnular space 20a while at the same time will be capable of axial travel along the mandrel 11. The sleeve R preferably is made of brass or steel and has tapering circumferential serrations R' formed about one end thereof. The sleeve R is inserted in the annular space 20a a distance sufficient to enable its serrations R' to be immersed in the molten metal M delivered by the pump 25, and is of a length sufficient to enable it to be gripped by the rolls 55 when thus mounted.

With the sleeve R in such starting position, the rolls 55 are caused to rotate slowly, thereby imparting a slow axial movement to the sleeve R. The slowly moving sleeve R restricts the flow of the molten metal in the annular space 20a, thus ensuring that the metal is formed into an integral cylinder therein. As the sleeve R continues its travel, the molten metal M, under pressure of the pump 25, follows it. Hence, the serrations R' remain submerged in the cylinder of molten melta. When the serrations R' reach the wter jacket 22, the surrounding metal M rapidly solidifies, with the result that a secure attachment is obtained between the sleeve R ind the nascent temporary mandrel S. By reason of such attachment, the temporary mandrel S will be pulled from the annular space 20a by the action of the rolls 55 acting through the sleeve R. After the sleeve R has completed its travel past rolls 55, and the rolls 55 are firmly gripping and conveying the temporary mandrel S, the longitudinally split sections of sleeve R are stripped from mandrel 11 and the machine is ready for operation.

An alternative method of commencing extrusion of the temporary mandrel S is to wrap a sufficient number of plies of paper about the stationary mandrel 11 adjacent the jacket 21 to block the annular space 20a. The paper plies will restrict flow of the molten metal through the annular passage 20a until the metal has formed into an integral cylinder therein. By increasing the discharge pressure of the pump 25 somewhat, the molten metal M, now formed into a cylinder in the annular space 20a, will force the paper plies axially along the stationary mandrel 11, discharging them from sleeve 20 after which they readily are removed from the mandrel 11. The advancing molten metal solidifies when it reaches the water jacket 22. The solidified metal, now the nascent temporary mandrel S, continues to advance axially of the mandrel 11 under the increased discharge pressure of the pump 25, emerging from the sleeve 20 and proceeding to the rolls 55 which then grip and impart axial movement to it. After the rolls 55 have seized the temporary mandrel S, the discharge presure of the pump 25 is reduced to its normal operating pressure.

Mounted for rotation about bearing extensions of the stationary sleeves 12, 13 and 14 of the transverse frames 2, 3 and 4 (see FIGS. 2, 7 and 8) are winding heads comprising, respectively, rotatable spiders 80, 81 and 82 each having plural radial arms 83 supporting at their distal ends tape reels 85 upon studs 86. In the embodiment shown, sleeves 12 and 14 each support two reels 85 while sleeve 13 supports four reels 85. It is to be understood, however, that the number of tape reels in each winding head and the number of winding heads utilized is a matter of design, and may vary over a very substantial range in order to attain desired section thickness and physical properties of the finished products.

The reels 85 of the spiders 80, 81 and 82 are wound with fabric tapes T, T' and T² woven or otherwise prepared from yarns composed of organic or inorganic fibers or filaments, or mixtures thereof, and coated and impregnated with resins, as will be more fully explained hereinafter. Through rotation of the spiders 80, 81 and 82, the tapes T, T' and T² are wrapped about the mandrel S in spiral relation to form a pipe P. It is essential that the tapes be wrapped about the mandrel S with a snugness sufficient to ensure that the resulting pipe P will travel axially with, and at the same speed as, the mandrel S, which now acts as a conveyor. The studs 86 upon which the tape reels 85 are supported on the arms 83 are inclined at an acute angle to the horizontal. The angle to which the studs are inclined determines the tape winding angle, and will vary in relation to the width of the tapes and the size of the pipe P.

The spiders 80 and 82 are rotated in the same direction through the medium of sprocket chains 87 and 88 from a countershaft 89 (see FIG. 3) rotatively supported in bearings 69', 70' and 71'. Countershaft 89 is, in turn, driven from the main shaft 68 through the medium of a chain 90. Spider 81 is rotated in the opposite direction to that of spiders 80 and 82 through a sprocket chain 91 from a second countershaft 92 which is geared to the main shaft 68 by spur gears 93 and 94. By having each succeeding spider rotate in a direction opposite to its next preceding spider, a cross winding of the tapes is obtained which results in higher strength properties in the produts fabricated on the machine. The ratios of the various sprocket chains and gear connections for rotating the spiders 80, 81 and 82 are such that the spiders are rotated at the same speed during operation of the machine.

Proper tensioning of the tapes during winding may be obtained through the use of tension brakes 86a (see FIG. 8) of any suitable standard design mounted on studs 86 in a manner well known in the art. The tapes prior to being fed to the mandrel S are coated on one or both sides with a liquid bonding resin, preferably having a high viscosity, which, when cured, as hereinafter explained, serves to fuse the tape laminations into a unitary structure of uniform density. A desirable bonding resin for this purpose is a 60% epoxide—40% polyamide resin having a curing temperature of between 250–320° F. The bonding resin may be applied to the tapes by any standard device (not shown), such as aspray, roller coater, knife coater, etc., prior to their being wound on the reels 85. Alternatively, the resin application devices may be mounted on the radial arms 83 of the spiders 80, 81 and 82 and the tapes passed therethrough as they travel from the reels 85 to the temporary mandrel S.

Thus, as the temporary mandrel S is advanced, it is spirally enveloped first in one direction with the tapes T from the spools of the spider 80, then in the opposite direction with the tapes T' from the spools of the spider 81 and then in the original direction with the tapes T² from the spools of the spider 82. In this manner, a spirally-wound, multi-ply tube or pipe P is continuously formed upon the temporary mandrel S from the resin coated tapes T, T' and T².

It is essential that the linear speed of the advancing temporary mandrel S be correlated with the rotational winding speed of the spiders 80, 81 and 82. Otherwise, non-uniform wrapping of the tapes about the mandrel S will result. Such correlation of linear and rotational speeds may be achieved by driving both the rolls 55 and the spiders 80, 81 and 82 from the main drive shaft 68 through appropriate connections, and by interposing the variable speed transmission 67 between the rolls 55 and the main drive shaft 68. With the spiders 80, 81 and 82 rotating at a predetermined and fixed speed, the variable speed transmission 67 will permit adjustment of the rotational speed of the rolls 55, and hence of the linear speed of the mandrel S, to ensure speed correlation.

In FIGS. 9–13 there is shown alternate means for controlling and correlating the linear speed of the temporary mandrel S in relation to the rotational winding speed of the spiders 80, 81 and 82. With such alternate means, the rolls 55 are eliminated and linear movement is imparted to the temporary mandrel S solely by the discharge pressure of the pump 25 which, in this instance, delivers molten metal to the annular extrusion space or passage 20a under a relatively high operating pressure of approximately 200 pounds per square inch. The linear speed of the mandrel S is determined by the speed of the pump 25 and the quantity of molten metal permitted by needle valve 305 (see FIG. 13) to pass through pipe 23 to the annular space 20a.

In the means of FIGS. 9–13 the spiders 80, 81 and 82 are rotated at a predetermined and fixed speed which is correlated with the linear speed of the mandrel S by correlation with a fixed speed of the pump 25 and the flow of metal past valve 305. Variation in the linear speed of the mandrel S is controlled and compensated for by means of a differential speed control device 76 having a pinion shaft 76a connected to main drive shaft 68 and a second pinion shaft 76b connected to a flexible shaft 77. The flexible shaft 77 is connected to a rotatable contact wheel 78 which is in frictional engagement with the temporary mandrel S and is supported upon a bracket 79 affixed to transverse frame 2. As mandrel S advances, contact wheel 78 is caused to rotate and such rotational movement is transmitted through flexible shaft 77 to pinion shaft 76b. The connections between the pinion shaft 76a and main shaft 68 on the one hand and between pinion shaft 76b and the flexible shaft 77 on the other hand are such that, when the linear speed of the advancing temporary mandrel S and the rotational speed of the spiders 80, 81 and 82 are properly correlated, the pinion shafts will rotate at exactly the same speed of rotation. As will be seen presently, the speeds of the spiders 80, 81 and 82 and of the mandrel S are constantly measured and transmitted to the control device 76.

The operation of the differential speed control device 76 is based upon constant measurement of the linear velocity of the advancing temporary mandrel S through wheel 78 and flexible shaft 77 and the use of differential gear mechanism which translates variations in the speed of the mandrel S through a system which automatically increases or decreases the flow of molten metal to the extrusion passage 20a to compensate for such speed variations. Referring to FIGS. 10–12, it will be seen that the differential speed control device 76 is supported on a base frame 270 having affixed thereto spaced trunnions 271a and 271b which sustain suitable bearings for the rotatable support, respectively, of the coaxial pinion shafts 76a and 76b. Also affixed to the base frame 270 are a pair of spaced frames 273a and 273b each of which support a pair of spaced, concentric, annular slip rings 274a and 274b. Each pair of slip rings 274a and 274b is concentric with the pinion shafts 76a and 76b.

Rotatably mounted on the spaced pinion shafts 76a and 76b is a hollow frame 275 of rectangular cross section which rotatably supports a shaft 276 disposed in its central transverse plane. Affixed to the shaft 276 is a differential gear 277 which meshes with a pair of spaced pinion gears 278a and 278b of identical size and affixed, respectively, to the opposed, inner ends of the pinion shafts 76a and 76b. The pinion shafts 76a and 76b are adapted to be rotated in the same direction from the shafts 68 and 77, respectively. Thus, when the pinion shafts 76a and 76b are rotated at the same speed, the differential gear 277 will not rotate about shaft 276, but the combined forces exerted thereon by the pinions 278a and 278b are transmitted to its shaft 276 to cause the frame 275 to rotate about the pinion shafts 76a and 76b in the direction of the broken arrows of FIG. 11.

As shown in FIGS. 10 and 12, shaft 276 protrudes through one wall of the frame 275 and has affixed to its protruding end a circular plate 279 on which is sustained a radial rocker arm 280 having two pair of spaced contact rollers 281a and 281b rotatably supported at its distal end. The rocker arm 280 is yieldingly mounted upon shaft 276 by means of threaded nut 282, coil spring 283 and pressure plate 284 with capacity for concentric movement relative to the shaft 276 for a purpose presently to be explained. Rocker arm 280, by reason of its support on shaft 276, rotates with frame 275 about an axis coincident with the axes of the pinion shafts 76a and 76b. Since the slip rings 274a and 274b also are concentric with the pinion shafts 76a and 76b, the rocker arm rollers 281a and 281b travel in a circular path which is adjacent the annular slip rings 274a and 274b and, when the speeds of the mandrel S and spiders 80, 81 and 82 are correlated, is intermediate the vertical planes thereof.

Thus, any decrease in the linear speed of the temporary mandrel S from its predetermined speed will be transmitted through roller 78, flexible shaft 77 and pinion shaft 76b to the pinion gear 278b. Such decrease in speed reduces the force exerted on the differential gear 277 by the pinion gear 278b with the result that the gear 277, under the now greater force of the pinion gear 278a, is caused to move in clockwise direction about its axis. Such movement of the gear 277 causes a similar movement of the shaft 276 with the result that the rocker arm 280 assumes position B shown in FIG. 10 with its pair of rollers 281b in contact with the slip rings 274b. Similarly, an increase in the linear speed of the temporary mandrel S will result in an increase in speed of the pinion gear 278b and consequential movement of differential gear 277 in a counterclockwise direction with resultant positioning of the rocker arm 280 in position A of FIG. 10 with its pair of rollers 281a in contact with the slip rings 274a.

Mounted on each of the opposing faces of the slip ring frames 273a and 273b, concentrically of the slip rings, are four opposing spaced cams 286a and 286b which are adapted to ensure interruption of contact of the rollers 281a and 281b with the slip rings 274a and 274b at 90° intervals, i.e. four times during travel of the rocker arm 280 about its circular path. Since the rocker arm 280 is yieldingly mounted on shaft 276, the cams 286a and 286b interrupt contact of the rollers 281a and 281b with the slip rings 274a and 274b by forcibly displacing the rocker arm 280 concentrically about the shaft 276 in a direction away from the contiguous slip rings.

Referring to FIG. 13, it will be seen that the slip rings 274a are connected in an electric circuit comprising power line 289, conductor 290, solenoid 291, conductor 292, conductor 293 and power line 294 and that slip rings 274b are connected in an electric circuit comprising power line 289, conductor 295, solenoid 296, conductor 297, conductor 298 and power line 294. The circuit through slip rings 274a is closed when the rocker arm assumes position A of FIG. 10 with its contact rollers 281a in contact with the slip rings 274a, and the circuit through the slip rings 274b is closed when the rocker arm 280 assumes position B of FIG. 10 with its rollers 281b in contact with the slip rings 274b. Thus, each pair of contact rollers and their corresponding pair of slip rings function as a switch which, when closed, respectively permits current to flow to the solenoids 291 and 296. The rollers 281a and 281b and the slip rings 274a and 274b thus are composed of copper or similar material having high electrical conductivity.

The solenoids 291 and 296 when excited function to activate a four way hydraulic valve 299 which in turn controls operation of a hydraulic motor 300. The motor 300 is connected by suitable gear transmission 302 to a threaded shaft 303 which comprises the distal end of a reciprocal stem 304 for the needle valve 305 interposed in pipe 23. It is to be noted from FIG. 13 that the needle valve 305 is surrounded with a steam jacket 306 to retain the metal therein in a molten state.

When the circuit through the slip rings 274a is closed, due to an increase in the linear speed of mandrel S, the solenoid 291 is excited and actuates valve 299 to cause motor 300 to move valve stem 304 in a direction to close the valve 305. Thus, the flow of molten metal to the annular extrusion space 20a is reduced with resultant reduction in the linear speed of the temporary mandrel S. Similarly, when there is a decrease in the linear speed of the mandrel S, the circuit through slip rings 274b is closed and the solenoid 296 is excited to actuate the valve 299 which, in turn, causes the motor 300 to move the valve stem 304 in a direction to open the valve 305. As a result, the flow of molten metal to the annular extrusion space 20a is increased with resultant increase in the linear speed of the temporary mandrel S.

By reason of the circularly spaced cams 286a and 286b, the rocker arm rollers 281a and 281b can remain only momentarily in contact with the slip rings 274a and 274b with the result that the circuits through the slip rings to their respective solenoids 291 and 296 can be closed only momentarily. Thus, control and adjustment of the linear speed of the mandrel S in relation to the rotational speed of the spiders 80, 81 and 82 is achieved by increments or pulses accomplished through the intermittent closing and opening of the circuits through the slip rings 274a and 274b. Hence, the cams 286a and 286b serve to preclude excessive increases or decreases in the linear speed of the mandrel S as a result of the compensatory action of the device 76. When the linear speed of the mandrel S has been properly adjusted in relation to the winding speed of the spiders 80, 81 and 82, the cams 286a and 286b serve to return the arm 280 and its rollers 281a and 281b to their normal path of travel intermediate the slip rings 274a and 274b.

In constructing multi-ply articles by winding tapes about a center core, such as a mandrel, there is a tendency for gaps to develop between the side edges of the tape windings in the fabricated product, particularly in the outer plies. This tendency may be compensated for in a number of ways, one of which is to form the tapes so that each succeeding tape wrapped about the center core is slightly larger in width than its predecessor. The increment of width increase of each tape is dependent upon the width of the tapes being used. Another way to compensate for the formation of such gaps is to vary the winding angle of the tape and the rotational speed of the spiders.

After winding of the tapes has been completed, the advancing temporary mandrel S, with the tapes wound thereon to form the pipe P, passes through the curing chamber or oven 15 for the purpose of curing the resin coatings on the tapes, thereby completing manufacture of the pipe P.

Referring now to the remelting head shown in detail in FIGS. 15-19, it will be noted that the permanent mandrel 11 terminates in a reduced portion 11a having threads at the distal end thereof onto which a short sleeve 95 is screwed. Mounted telescopically of sleeve 95 is an elongated sleeve 96 which has an outside diameter equal to that of mandrel 11 and thus functions as a prolongation thereof. The distal end of the sleeve 96 is closed by a plug 97 whose outermost diameter is substantially equal to the inside diameter of the pipe P. Plug 97 has a diametrically reduced axial extension 97a disposed internally of sleeve 96. A sleeve 98 is mounted telescopically of the extension 97a of plug 97 with its distal end engaged within the sleeve 95 so that the bore of sleeve 98 forms a continuation of the hollow of the permanent mandrel 11. The annular space 99 formed between the sleeve 96 and the sleeve 98 is closed adjacent the plug 97 by an annular plug 100. The rear portion of plug 97 is formed with an axial protuberance 97c on which is telescopically mounted a stationary mandrel 97d having an outside diameter equal to that of the temporary mandrel S.

The plug 97 is formed with a circumferential groove 97f which communicates with the annular space between the sleeve 96 and the pipe P (occupied by the temporary mandrel S) through circumferentially spaced passages 97b (see FIG. 17) in the forward portion of plug 97. The extension 97a of plug 97 has a longitudinal bore 101 in which a thermostat 102 is lodged, and a parallel bore 103 which, via a plurality of small radial ducts 105 (see FIG. 16), is in communication with the circumferential groove 97f. The thermostat 102 may be connected to an instrument panel (not shown) by means of electrical conductors (not shown) which extend from the thermostat entirely through the hollows of bore 101, sleeve 98 and mandrel 11 and emerge through the closed end wall 11b of the mandrel adjacent the cylinder head 10.

Affixed telescopically within bore 103 of the extension 97a of the plug 97 is a tube 106 which extends entirely through the hollows of sleeve 98 and permanent mandrel 11 and emerges through the closed end wall 11b of the mandrel 11, as shown in FIGS. 2 and 4, for connection by piping 107 and 108 to the reservoir 28 containing the molten metal M. Also disposed within the hollows of sleeve 98 and mandrel 11 is a steam inlet tube 110, said tube 110 terminating within sleeve 98 in a fitting 111 having a lateral port 112 communicating between tube 110 and the annular space 99. Like tube 106, the tube 110 extends entirely through the mandrel 11 and emerges through the end wall 11b thereof for connection to a suitable supply source (not shown) of steam.

Finally, there also is disposed within the hollows of sleeve 98 and mandrel 11 a steam return tube 115 which terminates within sleeve 98 in a fitting 116 having a lateral port 116a communicating between tube 115 and a channel 117 (see FIG. 18). Channel 117 extends partly around the outside wall of tube 98 and at its bottom is in communication with the annular space 99 through a port 118. Like tubes 106 and 110, the tube 115 extends entirely through the mandrel 11 and emerges through the end wall 11b thereof to connect by a pipe 119 to a jacket 120 surrounding pipe 107. Jacket 120 is connected, in turn, by a pipe 121 to a jacket 122 surrounding the pipe 108.

To prevent leakage, all of the telescoping parts of the remelting head preferably are joined together either by force fits or welding. Additionally, O rings or the like may be used where appropriate, as between sleeves 95 and 98 and in the annular plug 100.

Steam is circulated through the remelting head shown in FIG. 15 via tube 110, port 112 of fitting 111, annular space 99, which functions as a steam jacket, thence via port 118, channel 117, port 116a of fitting 116 and return tube 115. The steam returning through tube 115 passes through pipe 119, jacket 120, pipe 121 and jacket 122 from whence it is carried off by means of pipe 123 having trap 125 interposed therein.

By reason of the steam circulating through the annular space 99, the metal of the temporary mandrel S is raised above its melting point and thus returns to a molten condition. The temperature of the steam is well below the degradation temperature of the resins of the pipe P and hence has no damaging effect on them. The pressure of the advancing temporary mandrel S under the action of the rolls 55 forces the molten metal M in the remelting head to flow through the annular space between the pipe P and the sleeve 96, through the passages 97b, groove 97f, ducts 105 and bore 103 of plug 97, and through tube 106 and pipes 107 and 108 to the reservoir 28. It is to be noted that the molten metal M flows from the remelting head to the reservoir 28 via a closed system. Thus, the molten metal never comes in contact with the atmosphere which, if permitted would cause oxidation of the metal. Similarly, the molten metal travels in a closed system from reservoir 28 to the annular extrusion space 20a in sleeve 20. Since the molten metal M is thus protected from oxidation, it may be reused as long as desired.

The metal M is maintained in a molten condition throughout tube 106 by the heat of the steam circulating through the adjacent tubes 110 and 115. In order to ensure that sufficient heat is transmitted from the steam tubes 110 and 115 to the tube 106 to maintain the metal therein in a molten state, the three tubes are enveloped in a spirally wound copper ribbon 126, as shown in FIGS. 4, 14, 15 and 19. Since copper is a good conductor of heat, heat from the tubes 110 and 115 will be transmitted through the enveloping ribbon 126 to the metal conducting tube 106, thus maintaining the metal therein in a molten state. To ensure that heat from the steam tubes 110 and 115 does not melt the metal of the temporary mandrel S before it reaches the remelting head, the copper ribbon 126 may be enveloped with a suitable heat insulation material (not shown), such as asbestos. In many applications of this invention, however, the inner wall of the mandrel S will be sufficiently spaced from the tubes 110 and 115 to permit dispensing with such insulation.

The pipe P continues its linear travel as a result of the action of rolls 55 upon the temporary mandrel S, passing over the remelting head, plug 97 and stationary mandrel 97d. As pipe P passes over the mandrel 97d it is further supported by a delivery roll 127 sustained by a bracket 128 affixed to the transverse frame 5. Roll 127 preferably is an idler roll but may be driven to assist in the delivery of the pipe P.

It is important to note that the fixed mandrel 11 of the apparatus shown in FIGS. 1–19 is supported by the head 10 at the extrusion end of the machine and by the roll 127, acting through pipe P, mandrel 97d, plug 97, sleeve 98 and sleeve 95, at the delivery end of the machine. If additional support of mandrel 11 is desired or required, it may be provided by the interposition of one or more spaced electro-magnets between the extrusion sleeve 20 and the remelting head in a manner well known in the art.

*Operation of preferred apparatus*

With the machine operating under normal conditions, steam circulates through pipe 43, jacket 40, pipe 44, jacket 21, pipe 45, jacket 37, pipe 46, hollow 30, pipe 47, jacket 29 and pipe 48, and through tube 110, the remelting head shown in FIG. 15, tube 115, pipe 119, jacket 120, pipe 121, jacket 122 and pipe 123 at a temperature sufficient to maintain the metal M in a molten condition. The molten metal M in reservoir 28 is continuously pumped by pump 25 through pipe 23 to the annular extrusion space 20a between sleeve 20 and the mandrel 11. The molten metal M is extruded through the annular space 20a where, upon coming in contact with the inside wall of the cooling jacket 22, it is solidified to form a rigid temporary mandrel S. The temporary mandrel S thus formed is supported by the stationary mandrel 11 and is caused to travel axially of the mandrel 11 in the direction of the arrows in FIGS. 1 and 2 under the action of the rolls 55. As the temporary mandrel S passes through the winding heads supported by the transverse frames 2, 3 and 4, it is spirally enveloped with a plurality of resin coated tapes T, T' and T². The tapes T, T' and T² are tightly wrapped about the temporary mandrel S in successive plies to form a pipe P. By reason of the tight frictional contact between the tape plies and the supporting mandrel S, the pipe P moves axially with the mandrel S and enters the hollow curing chamber 15. Steam is circulated through the coils 18 of the chamber 15 at a temperature sufficient to cure the bonding resin coated on the tape plies comprising the pipe P. Complete curing of the bonding resin in pipe P may take place in the chamber 15. Alternatively, the resin may be brought to a condition of "hard gel" in which event final curing thereof takes place following the exit of the pipe P from the chamber 15 through the action of the residual heat in the pipe P and the mandrel S.

As pipe P and mandrel S continue their linear travel, they pass over the remelting head shown in FIG. 15 where the metal of the mandrel S is melted by the heat of the steam circulating through the annular jacket 99. Under the pressure of the advancing temporary mandrel S, the molten metal is forced through passages 97b, groove 97f, ducts 105 and bore 103 of the plug 97 from whence it is returned, in its molten condition, to the reservoir 28 by way of tube 106 and pipes 107 and 108. The pipe P meanwhile continues its linear advance under the action of the rolls 55 (which impart movement to the temporary mandrel S and hence to the plastic pipe P) and travels telescopically over plug 97 and stationary mandrel 97d from whence it is discharged as a continuous structure from the machine. The continuous pipe thus discharged from the machine may be cut into appropriate lengths by any well known means (not shown); such as a flying saw, for use as desired.

The temperature of the stem circulating through the coils 18 of the chamber 15 will vary depending on the curing temperature of the bonding resin used. In many applications of this invention, such steam temperature will reach or exceed the melting point of the metal of the mandrel S, causing it to return to a plastic or even molten condition while within the chamber 15. Should complete liquefaction of the mandrel S take place in the chamber 15, the bonding resin by that time will be sufficiently cured to maintain the structural integrity of the pipe P and hence prevent leakage of the molten metal through the pipe wall. Thus, in many instances the mandrel S will reach the remelting head in a molten or plastic condition.

It is to be noted that the apparatus of this invention is particularly adaptable for use in the open field where it may be mounted upon a vehicle which, traveling in timed relation to the pipe production of the machine, is adapted to continuously lay the pipe P as an integrated structure in an open ditch, or upon appropriate supporting structure, or on the ground, as desired. Thus, this invention particularly lends itself to the rapid production and installation of integral piping for use in oil fields, irrigation projects, gas lines and similar installations. If desired, metal tapes of aluminum, steel and the like may be substituted for one or more of the fabric tapes T, T' or T², or may be used in addition thereto. Such interwrapping of metal with the fabric tapes may be utilized to prevent leakage through the pipe wall of the fluids passing through the pipe. In addition, the leakproof qualities of the pipe may be improved by forming the initial ply or plies from paper tape impregnated with an elastomeric compound.

Alternatively, a leakproof inner lining or coating for piping fabricated in accordance with this invention may be provided by spraying an elastomeric compound on the mandrel S before winding of the tapes thereon. Such resin should be sprayed on the mandrel S far enough in advance of the first winding head to enable the compound to gel sufficiently, from the residual heat of the mandrel, to prevent penetration or displacement by the tapes. A compound having good film forming properties and which is compatible with the tape bonding resin should be used. For example, a coating resin composed of one part polysulphide polymer and two parts epoxy resin suitably amine catalyzed produces highly satisfactory results with a tape bonding resin comprising forty parts polyamide and sixty parts epoxy resin. To prevent "running" of these resins, a thixotropic additive may be used.

*Description and operation of modified apparatus*

In FIGS. 26 and 27 there is shown in schematic form the adaptation of this invention to the production of plastic supporting structures, such as channels. The apparatus of FIGS. 26 and 27 comprises a first extruder 200 from which a first temporary shaping support or mold S' is extruded from a metal having a relatively low melting point. The mold S' is extruded from molten metal in a manner similar to the extrusion of the mandrel S in the apparatus shown in FIG. 4, and is of channel-like cross section with outwardly disposed flanges along each of the top edges of the side walls thereof. The mold S' is advanced in a linear direction under the action of a plurality of rolls 201.

As the mold S' advances, a plurality of resin coated tapes T³ and T⁴ from spools 202 are forced in the hollow thereof under the action of pressure rolls 203 to form a multi-ply channel C. Each succeeding tape is of a slightly smaller width than its predecessor so that the side wall plies of the channel C formed therefrom are co-terminus. The increment of reduction of width of the succeeding tapes is dependent upon the size and thickness of the tapes used.

After the last of the tapes has been laid in the mold S', the advancing channel C and mold S' pass below a second extruder 205 from which is extruded a second temporary metal mold $S^2$ having a cross section like mold $S'$, but reduced in size so as to fit snugly upon the channel C. Complemental pressure rolls 206 force the upper mold $S^2$ into the channel C so that channel C is securely retained between the two temporary molds $S'$ and $S^2$, as shown in FIG. 27. The ensemble then passes through a curing chamber 207 where the bonding resin in the channel C is cured by heat from steam circulating through pipes 208 and 209 and 210 and 211.

The ensemble, upon exiting from the chamber 207, is separated into its individual components by separators 213. The upper mold $S^2$ then proceeds to the re-melting head 214 and the lower mold $S'$ proceeds to the re-melting head 215. The metal of the upper mold $S^2$ is melted in the re-melting head 214 by steam circulating through pipes 216 and 217 and the molten metal thereof is returned to its source through pipe 218. Similarly, the metal of the lower mold $S'$ is melted in the re-melting head 215 by steam circulating through pipes 220 and 221 and the molten metal thereof is returned to its source by way of pipe 222. The channel C, with its resin now cured, emerges from the apparatus in a continuous structure for use as desired.

*Description of tape treating apparatus*

The tapes T, T', $T^2$, $T^3$ and $T^4$ used in the practice of this invention preferably are formed from yarns of organic or inorganic fibers, or mixtures thereof. Examples of tapes which may be used in this invention are shown in FIGS. 20, 21, 22 and 23. In the plain weave of FIG. 20, the warp yarn W and filling yarn F are continuously interlaced. In the long shaft satin weave of FIG. 21, each warp yarn W' and each fill yarn F' goes under one and over a plurality of yarns. In the unidirectional weave of FIG. 22, a strong warp yarn $W^2$ is interlaced with a relatively weak fill yarn $F^2$ to give maximum strength in the warp direction. It is to be understood, of course, that tapes formed of other types of weaves, as well as non-woven tapes, such as paper, felt, etc., may be used in the practice of this invention. For example, there is shown in FIG. 23 a non-woven tape composed of warp yarns only. The yarns of this tape are bonded together in parallel relation by a thin cured coating of a suitable bonding resin, such as a 2% to 4% solution of a long branch chain phenolic resin or a 2% to 4% catalyzed epoxide resin.

In practice, I prefer to fabricate the pipe P of FIGS. 1 and 2 from tapes formed of fiber glass yarn or rovings. While glass tapes have high physical properties, and are advantageous in use from the point of view of materials costs, there is a decided tendency for air inclusions or voids to develop in resin impregnated fiber glass structures. This tendency also occurs in varying degrees with tapes formed of other fibers, both inorganic and organic. In the construction of plastic piping, channels, angles, I-beams, and the like, it is of the utmost importance that air inclusions be eliminated from the structures. While air inclusions generally are microscopic in size, an excessive number of them in plastic structures will tend to weaken the physical strength thereof and, in the case of piping, reduce its leakproof properties.

I have discovered that it is possible to eliminate such air voids or inclusions by treating the glass tapes while in a vacuum as follows: First impregnating the tape fabric with a low viscosity resin, partially or completely curing the resin, then impregnating the tape fabric with a higher viscosity resin and curing the second resin. In practice, liquid resins comprising an 85% catalyzed epoxide resin and a 15% polysulphide polymer have proven highly satisfactory as both low and high viscosity resins, the high viscosity resin differing in composition only in that it contains a thixotropic additive to increase its viscosity. Such resins have a curing temperature of between 250–300° F.

Preferably, prior to vacuum impregnation the tapes are pretreated by impregnating and curing a suitable bonding resin therethrough to promote wetting and adhesion to the tape filaments of the low and high viscosity resins. The pretreatment resin preferably should comprise either a 2% to 4% solution of a long branch chain phenolic resin or a 2% to 4% catalyzed epoxide resin, each type resin having a curing temperature of between 320–340° F. and a temperature resistance of about 350° F. when cured. The pretreatment may be carried out by the use of standard resin impregnating and curing equipment of the type presently in use in the textile and paper industries. As a result of the pretreatment, a thin coating of cured resin is deposited on the tape filaments and serves not only to promote the wetting and adhesion of the later applied low and high viscosity resins, but also acts as a binder at all points of contact of one filament with another.

For impregnating the tape fabrics with the low and high viscosity resins, I have devised the apparatus illustrated in FIG. 24. As shown, this apparatus is in the form of a vacuum tower 130 having flanking extension chambers 131 and 132 at the bottom thereof. Chambers 131 and 132 are individually accessible through hinged air-tight covers 133 and 134. Mounted, respectively, in chambers 131 and 132 are a tape fabric supply roll 135 and a tape fabric collecting or take-up roll 136. The shaft 137 of the supply roll 135 is rotatively supported in split bearings jointly provided by the chamber 131 and its cover 133 along the plane of meeting. Similarly, the shaft 138 of the collecting roll 136 is supported in bearings jointly provided by the chamber 132 and its cover 134 in the plane of meeting, and is arranged to be driven by a belt 139 from a suitable power source (not shown).

Disposed at the base of the tower 130 is a tank 140 which is subdivided by a partition into two compartments 141 and 142, the first for containment of the low viscosity resin and the second for containment of the high viscosity resin. These resins are delivered, respectively, from suitable supply sources (not shown) through pipes 143 and 144. The compartments 141 and 142 of the tank 140 are provided, respectively, with overflow outlets 145 and 146 so that the liquid levels therein are maintained constant.

Within the tower 130, adjacent its opposite side walls, are vertically arranged coils 147 and 148 into each of which steam is introduced at the bottom and discharged from the top thereof. During treatment of the tape fabric, air in the tower 130 and chambers 131 and 132 is exacuated, to create a vacuum therein, by way of a pipe 149 connected to a suitable suction source (not shown).

*Operation of tape treating apparatus*

The operation of the apparatus shown in FIG. 24 proceeds as follows: With a vacuum maintained in tower 130 and chambers 131 and 132, the tape fabric is drawn from supply roll 135 and is directed over idler roll 150 and downwardly into compartment 141 to under-travel roll 151 submerged in the resin therein, and thus is saturated with the low viscosity resin. From compartment 141, the fabric passes upwardly through doctor rolls 147, where the excess resin is removed, and through the hollow of the steam coil 147. During its travel through the steam coil 147, the fabric is heated to cure and set the resin impregnated therein. At the top of the tower, the fabric passes over idler roll 152 and proceeds downwardly through tower 130 into compartment 142 to under-travel the roll 153 submerged in the resin therein, whereby the fabric is saturated with the high viscosity resin. From compartment 142, the fabric proceeds upwardly through the doctor rolls 158, where the excess resin is removed, and through the hollow of the steam coil 148, where the second resin application is cured and set. After emerging from the hollow of the coil 148, the fabric passes over idler roll 155, proceeds downwardly through tower 130, underpasses the idler roller 156 and proceeds to the collecting roll 136.

Since a vacuum is maintained in tower 130 and chambers 131 and 132 during treatment of the tape fabric, the resins are uniformly impregnated and cured throughout the fabric without incidental formation of air inclusions or voids therein. If desired, bulk fabric wound upon textile beams may be treated in the apparatus of FIG. 24. Such bulk fabric, following its removal from chamber 132, is cut into tapes which, in turn, are wound upon the individual reels 85 hereinbefore referred to. The cutting of the fabric into tapes may be accomplished by any suitable commercially available device in a manner well known to those schooled in the textile arts.

In FIG. 25 there is shown in schematic cross section a portion of a tape fabric following its treatment in the apparatus of FIG. 24. In this sectional view there are shown two glass yarns or rovings enclosed, respectively, within the broken lines 248 and 249. The filaments of the glass rovings are indicated at 250, the pretreatment resin at 251, the low viscosity resin at 252 and the high viscosity resin at 253. The upper surface of the resin impregnated tape fabric is indicated at 254 and its lower surface at 255. While each glass roving in FIG. 25 is shown to comprise only five filaments 250, in actual commercial production the rovings comprise some sixty or more filaments. As may readily be seen, the interstices between the glass rovings and between their individual filaments are filled with resin, thereby eliminating air voids or inclusions.

With some tape fabrics, it may not be necessary to use both a low and a high viscosity resin in order to eliminate air inclusions, but either one or the other of such resins may be sufficient. In such case, the resin selected may be contained in either of the compartments 141 and 142, with the other compartment remaining empty. Alternatively, a modified tower apparatus may be used having only a single resin containing compartment in the bottom thereof and a single steam coil disposed above the compartment.

While preferred embodiments of this invention have been described in detail, it will be obvious to one skilled in the art that various modifications may be made therein without departing from the invention as hereinafter claimed.

Having thus described my invention, I claim:

1. A method of fabricating a shaped elongated article comprising the steps of continuously forming an integral, rigid shaping support from molten material drawn from a source of supply; continuously advancing the support as it is formed; applying resin bearing tape on the advancing support at a tape application station to form the article; curing the resin at a resin curing station while the article is sustained upon and advanced by the support; heating the support as it advances from the curing station to restore its most advanced portion to a molten condition; and removing the molten material from the article and returning it while in its molten condition to the supply.

2. The method of claim 1 wherein the molten material is at all times maintained in a closed system.

3. The method of claim 1 wherein the support is continuously extruded from molten metal.

4. The method of claim 1 wherein the support is advanced in timed relation to the application of the tape thereon.

5. The method of claim 1 further including the step of impregnating and curing a resin throughout the tape prior to the application of the tape to the support.

6. A machine for fabricating shaped elongated articles comprising a supply of melted material; means for continuously forming an integral, rigid shaping support from the melted material; means for delivering the melted material from the supply to the support forming means; means for advancing the support as it is formed in a linear direction; tape application means for applying on the advancing support resin bearing tape to form the article; a chamber in which the resin is cured while the article is sustained upon and advanced by the support; a remelting head for continuously remelting the most advanced portion of the support after it emerges from the chamber; and means for removing the remelted material from the article and returning it in its melted condition to the supply.

7. The machine of claim 6 further including a closed system for maintaining the melted material free of contact with the surrounding atmosphere.

8. The machine of claim 6 further including means for advancing the support in timed relation to the application of the tape thereon.

9. The machine of claim 6 further including means for controlling the speed of advancement of the support, said means including a speed control device; means for transmitting the linear speed of the support to the speed control device; valve means for controlling the rate of delivery of molten material to the support forming means; and means actuated by the speed control device to operate the valve means to increase or decrease the rate of delivery of molten material to the support forming means to thereby vary the speed of advancement of the support.

10. The apparatus of claim 9 wherein the speed control device includes spaced co-axial annular slip ring units; a pair of spaced co-axial pinions adapted to rotate in the same direction and at the same speed when the support is advancing in proper timed relation to the application of the tape thereon, said pinions being co-axial with the slip ring units; a differential gear disposed in meshing engagement with the pinions; a rotatable shaft disposed intermediate of the slip ring units to which the differential gear is affixed; a rotatable support for the shaft, said support adapted to rotate about the common axis of the slip ring units and pinions; and a rocker arm yieldingly supported on the shaft having spaced rollers adapted to contact the slip ring units upon rotary movement of the differential gear to operate thereby the means for actuating the valve means.

11. The apparatus of claim 10 wherein the rocker arm rollers, upon rotation of the shaft support, are adapted to travel in a circular path adjacent and intermediate of the slip ring units; wherein the rocker arm rollers, upon rotary movement of the differential gear, are adapted to contact one or the other of the slip ring units during travel of the rollers along their circular path; and further including means for periodic interruption of contact of the rollers with the slip ring units.

12. The apparatus of claim 11 wherein each slip ring unit is connected by an electric circuit to the means for actuating the valve means and wherein each said circuit is closed upon contact of the rocker arm rollers with the slip ring unit in said circuit.

13. In apparatus for fabricating shaped articles, a supply of molten material; means for continuously forming an integral, rigid shaping support for the articles from the molten material; means for delivering the molten material from the supply to the support forming means; means for advancing the shaping support in a linear direction as it is formed; a remelting head for remelting the support as it advances beyond a predetermined position; and means for refluxing the remelted material to the supply.

14. The apparatus of claim 13 further including means for maintaining the refluxed material in a molten condition as it is returned to the supply.

15. The apparatus of claim 13 further including valve means for controlling the rate of delivery of molten material to the support forming means whereby the speed of linear advancement of the support may be controlled and a speed control device adapted to actuate the valve means to vary the speed of advancement of the support.

16. In control means for correlating and maintaining the speed of a linearly advancing element in timed relation to the rotational speed of a rotatable element, such control means having means for rotating the rotatable element at a fixed speed, means for advancing the linearly advancing element at a speed correlated to the rotational speed of the rotatable element and means to control and adjust the means for advancing the linearly advancing element to compensate for variations in the linear speed of such element; a speed control device comprising spaced co-axial slip rings units; a pair of spaced co-axial pinions adapted to rotate in the same direction and at the same speed when the speed of the linearly advancing element is correlated with the rotational speed of the rotatable element, said pinions being co-axial with the slip ring units; a differential gear element in engagement with the pinions; a rotatable shaft disposed intermediate of the slip ring units to which the differential gear element is affixed; a rotatable support for the shaft, said support being adapted to rotate about the common axis of the slip ring units and the pinions; and a rocker arm yieldingly supported on the shaft having spaced rollers adapted to contact the slip ring units upon rotary movement of the differential gear element to thereby actuate the means for controlling and adjusting the means for advancing the linearly advancing element.

17. The apparatus of claim 16 wherein the rocker arm rollers, upon rotation of the shaft support, are adapted to travel in a circular path adjacent and intermediate of the slip ring units; wherein the rocker arm rollers, upon rotary movement of the differential gear element, are adapted to contact one or the other of the slip ring units during travel of the rollers along their circular path; and further including means for periodic interruption of contact of the rollers with the slip ring units.

18. The apparatus of claim 17 wherein each slip ring unit is connected by an electric circuit to the means for controlling and adjusting the means for advancing the linearly advancing element and wherein each said circuit is closed upon contact of the rocker arm rollers with the slip ring unit in said circuit.

References Cited in the file of this patent

UNITED STATES PATENTS

| | | |
|---|---|---|
| 1,338,624 | Heppes | Apr. 27, 1920 |
| 1,343,191 | Alcutt | June 15, 1920 |
| 1,667,408 | Allen | Apr. 24, 1928 |
| 2,017,216 | Marcus | Oct. 15, 1935 |
| 2,346,523 | Vincent | Apr. 11, 1944 |
| 2,512,008 | Bickel | June 20, 1950 |
| 2,523,966 | Nicholson | Sept. 26, 1950 |
| 2,714,414 | Ganahl et al. | Aug. 2, 1955 |
| 2,723,705 | Collins | Nov. 15, 1955 |
| 2,744,043 | Ramberg | May 1, 1956 |
| 2,754,237 | Brooks | July 10, 1956 |
| 2,760,549 | Nash et al. | Aug. 28, 1956 |
| 2,859,290 | Grinage | Nov. 4, 1958 |